United States Patent [19]
Vuichard et al.

[11] Patent Number: 4,998,209
[45] Date of Patent: Mar. 5, 1991

[54] AUTOMATIC FOCUSING CONTROL OF A VIDEO CAMERA FOR INDUSTRIAL AND MILITARY PURPOSES

[75] Inventors: Albin Vuichard, Mollis; Werner Gebauer, Oberhasli; Bruno Bühler, Stadel, all of Switzerland

[73] Assignee: Contraves AG, Zurich, Switzerland

[21] Appl. No.: 382,111

[22] Filed: Jul. 19, 1989

[30] Foreign Application Priority Data

Jul. 28, 1988 [CH] Switzerland .......................... 02858/88

[51] Int. Cl.$^5$ ............................................. H04N 5/00
[52] U.S. Cl. ..................................... 364/513; 358/169
[58] Field of Search ........................ 364/181, 424-422, 364/514, 513, 525; 901/42, 46, 47; 354/410, 413, 451, 456; 358/151, 169, 174, 168, 209, 244

[56] References Cited

U.S. PATENT DOCUMENTS

| | | | |
|---|---|---|---|
| 3,569,620 | 3/1971 | Baun | 358/174 |
| 3,881,054 | 4/1975 | Walla | 358/169 |
| 4,091,419 | 5/1978 | Rhee et al. | 358/169 |
| 4,204,222 | 5/1980 | Heuze | |
| 4,204,229 | 5/1980 | Heuze | 358/169 |
| 4,318,129 | 3/1982 | Zwirn | 358/169 |
| 4,506,292 | 3/1985 | Newton et al. | 358/168 |
| 4,613,269 | 9/1986 | Wilder et al. | 364/513 |
| 4,623,933 | 11/1986 | Sato et al. | 358/174 |
| 4,679,087 | 7/1987 | Torrano, Jr. et al. | 358/244 |
| 4,682,231 | 7/1987 | Yamakawa | 358/169 |
| 4,706,120 | 11/1987 | Slaughter et al. | 364/513 |
| 4,707,647 | 11/1987 | Coldren et al. | 364/513 |
| 4,761,687 | 5/1987 | Rumreich | 358/174 |
| 4,815,733 | 2/1988 | Yokoi | 364/513 |
| 4,843,568 | 6/1989 | Krueger et al. | 364/518 |
| 4,852,002 | 7/1989 | Klausz | 358/169 |
| 4,855,830 | 8/1989 | Davis et al. | 358/168 |
| 4,882,694 | 5/1988 | Brubaker et al. | 364/424.02 |

FOREIGN PATENT DOCUMENTS 0034737  2/1981  Switzerland .

OTHER PUBLICATIONS

I. Plander, "Trends in the Development of Sensor Systems and Their Use in Some Technological Areas", published in Robotoics, vol. 3, No. 2, pp. 157–165, Jun. 1987, by Elsevier Science Publishers B.V. Amsterdam.
M. Kabuka et al entitled "Robot Vision Tracking System", published in IEEE Transactions on Industrial Electronics, vol. 35, No. 1, pp. 40 to 14 51, Feb. 1988.

Primary Examiner—Allen R. MacDonald
Assistant Examiner—George Davis
Attorney, Agent, or Firm—Sandler, Greenblum & Bernstein

[57] ABSTRACT

The brightness and the contrast are optimized in a video image which is used for controlling a manipulator unit. For this purpose, the gain/offset control means of a video camera producing the video image, is controlled using an image control unit in a manner such that the image data of an object can be processed by the image control unit in optimum manner. The manipulator unit may comprise an industrial robot manipulating a workpiece or a tool of a machine tool acting upon a workpiece. The manipulator unit can also be constructed as a target tracking platform for tracking a target which is imaged by the video camera.

19 Claims, 3 Drawing Sheets

AUTOMATIC FOCUSING CONTROL OF A VIDEO CAMERA FOR INDUSTRIAL AND MILITARY PURPOSES

CROSS-REFERENCE TO RELATED APPLICATION

This application is related to the commonly assigned, co-pending U.S. application Ser. No. 07/380,470, filed July 17, 1989, entitled "AUTOMATIC FOCUSING CONTROL OF A VIDEO CAMERA FOR INDUSTRIAL AND MILITARY PURPOSES". The disclosure of this application is incorporated herein by reference.

BACKGROUND OF THE INVENTION

The present invention relates to a new and improved construction of an apparatus for, and a method of, automatic gain/offset control of a video camera.

The invention thus generally relates to the fields of optics and electronics and, specifically, to the field of image processing techniques. In its more particular aspects the present invention specifically relates to a new and improved construction of an apparatus for, and a method of, automatic gain/offset control of a video camera for automatically optimizing the brightness and the contrast of a video image which is used for controlling the adjustment of a manipulator unit. In particular, the video camera is utilized for controlling the operation of an industrial robot. The video camera also may constitute a FLIR camera, i.e. a forward looking infrared camera and may be connected to an image control unit constituting a so-called video tracker in an automatic target tracking device. An infrared camera which is sensitive to heat radiation, is conventionally designated as a forward looking infrared camera.

Means for optimizing the brightness distribution in images are well-known. Thus, in modern photo cameras, the film exposure is optimized, for example, either by automatically adjusting the aperture at a predetermined exposure or exposure duration or by means of a programmable optically controlled exposure time-aperture combination. In such systems, the required brightness data are obtained either from the mean brightness value of the entire image, the brightness of a small preselected section or frame of the image by means of a so-called spot measurement, or from a comparison of a predetermined number of partial image sections or frames. This can be derived from the data sheets of respective photo cameras.

When using cameras employing electronic image recording such as, for example, video cameras, there can not only be optimized the brightness by means of the offset control but also the image contrast may be subjected to an optimizing operation. For this purpose there is varied, in addition to the offset, a second parameter, namely the gain which corresponds to a displacement of the image brightness distribution along the brightness axis. In such case, reference is made to an automatic gain/offset control.

Conventionally, the gain/offset control in video cameras is adjusted to provide an image which is as attractive as possible and as rich in information as possible for the human eye.

Hitherto and, for example, with respect to robotics, the gain/offset control was used in connection with video cameras for the recognition or detection of objects and for controlling related manipulator units. In such uses, the gain/offset control adjustment was optimized, if optimized at all, in accordance with the criterion of good visual recognizability. Thus the image was adapted in an optimum manner with respect to the eye of the machine operator but not with respect to the mode of operation of the control device connected with such video camera for controlling the manipulator unit.

In the same manner the gain/offset control adjustment was carried out in connection with video cameras utilized for target tracking, in accordance with optimum visual recognizability. This means that the video camera like, for example, the aforementioned forward looking infrared camera was controlled in a manner such that no saturation was observed merely within a predetermined image section or frame. Although thereby there was favorably insured an additional visual target monitoring process, however, the image did not constitute in any case an optimum image for automatically tracking the target by means of the target tracking platform.

It will be apparent that the human eye and an electronic image evaluating unit place different requirements on the image quality. The reason therefore is that the physiological process of vision by the human eye is proportional to the logarithm of the light intensity whereas, during electronic image recording, the recorded signal is linearly dependent upon the light intensity in a first approximation.

Furthermore, and by virtue of the integral image perception by the human eye, a structure or object is relatively readily distinguished or discriminated with respect to an associated background even at a poor signal-to-noise ratio or poor contrast Contrary thereto, automatically operating structure or object recognition means can extract the information related to the object or structure from a comparison of adjacent image brightness values only at great expenditure and on the basis of a fairly exceptional or extensively devised algorithm. Consequently, it is highly significant that the brightness of the object to be recognized compares as favorably as possible with the brightness of the background associated with the object to be recognized.

Regarding the automatic gain/offset control of a video camera, it should be noted that it is not intended to generate an image which is as favorable as possible for the human eye. Instead, the image should be optimized with respect to further electronic processing operations particularly in connection with the control of the performance of the manipulator unit. In order to obtain such optimization, it is thus required that the object to be monitored by the video camera can be distinguished or differentiated from the associated background. Such precondition can be satisfied at least for some periods of time by objects which move relative to the associated background.

SUMMARY OF THE INVENTION

Therefore with the foregoing in mind it is a primary object of the present invention to provide a new and improved construction of an apparatus, and a method of, automatic gain/offset control of a video camera and which apparatus and method are not afflicted with the drawbacks and limitations of the prior art heretofore discussed.

Another and more specific object of the present invention is directed to the provision of a new and improved construction of an apparatus for, and a method of, automatic gain/offset control of a video camera and which apparatus and method permit providing an image of optimum quality in terms of brightness and contrast.

A further important object of the present invention is directed to a new and improved construction of an apparatus for, and a method of, automatic gain/offset control of a video camera and which apparatus and method permit adjusting the gain/offset control means of a video camera such that an optimum image is provided for controlling the operation of an industrial robot.

Still another significant object of the present invention aims at providing a new and improved construction of an apparatus for, and a method of, automatic gain/offset control of a video camera and which apparatus and method permit adjusting the gain/offset control means of a video camera in a manner such as to provide an optimum image for carrying out a target tracking operation.

Now in order to implement these and still further objects of the invention, which will become more readily apparent as the description proceeds, the apparatus of the present development is manifested, among other things, by the features that, there is provided an image control unit operated according to an image evaluating algorithm. The image control unit is connected with the video camera and generates control signals for adjusting the gain/offset control means of the video camera for automatically recognizing or detecting the image of an object relative to the image of the background associated with the object in an optimum manner in terms of brightness and contrast.

Specifically, the video camera is connected with a manipulator unit for controlling the position of the video camera or, if desired, an object to be monitored by the video camera. In such case, the image control unit is connected to a main computer or computer means which in turn is connected with the manipulator unit through a suitable servo system.

As alluded to above, the invention is not only concerned with the aforementioned apparatus aspects, but also relates to a new and improved method carried out by operating the inventive apparatus. Generally speaking, the inventive method relates to an automatic gain/offset control of a video camera.

To achieve the aforementioned measures, the inventive method, in its more specific aspects, comprises the following steps:

imaging an object and a background associated with the object by means of a video camera;

determining, by means of a gray-scale histogram analysis, the brightness of the image of the object and the brightness of the background associated with the object as well as the contrast between the image of the object and the image of the background associated with the object;

on the basis of the values of an evaluating algorithm, generating control signals by means of an image control unit for automatically adjusting the image of the object and the image of the background associated with such object in terms of brightness and contrast and feeding the control signals to the gain/offset control means of the video camera.

More specifically, the video camera may be employed for controlling the adjustments of a computer-controlled manipulator unit.

The inventive apparatus as well as the inventive method thus rely upon an automatic control which, in turn, relies upon real-time image evaluation, for adjusting the gain/offset control means of a video camera. Such video camera is used, for example, in connection with an industrial robot or may constitute a FLIR camera, i.e. a forward looking infrared camera of a target tracking platform in a manner such that the image control unit provides an optimum image in terms of brightness and contrast under the prevailing imaging conditions and an optimum control of the operation of the manipulator unit constituting or comprising the aforementioned industrial robot or platform, for example, target tracking platform.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings, there have been generally used the same reference characters to denote the same or analogous components and wherein.

DETAILED DESCRIPTION OF THE PREFERRED EMBODIMENTS

Figure 1:
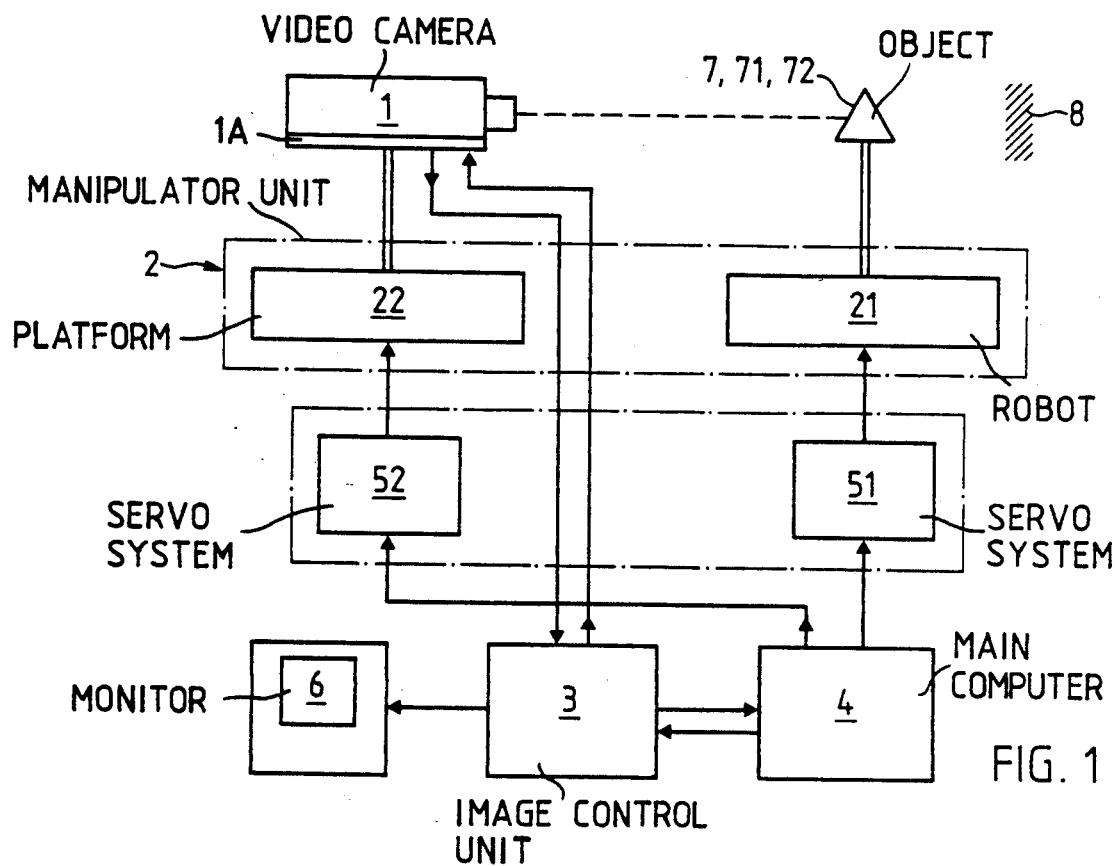
FIG. 1 is a schematic block circuit diagram showing a first exemplary embodiment of the inventive apparatus for carrying out a first exemplary embodiment of the inventive method and comprising a video camera, an image control unit and a controllable manipulator unit constituting or comprising an industrial robot.

Describing now the drawings, it is to be understood that only enough of the construction of the apparatus has been shown as needed for those skilled in the art to readily understand the underlying principles and concepts of the present development, while simplifying the showing of the drawings. Turning attention now specifically to FIG. 1 of the drawings, the apparatus illustrated therein by way of example and not limitation in a schematic block circuit diagram will be seen to comprise an automatically controllable manipulator unit 2 comprising, for example, an industrial robot 21 or a fully automated controllable machine tool. A video camera 1 monitors the grasping and manipulation of the object 7 which may constitute, for example, a workpiece 71 which is grasped and manipulated by the industrial robot 21, or a tool 72 of the aforementioned controllable machine tool operating upon a workpiece.

Figure 4:
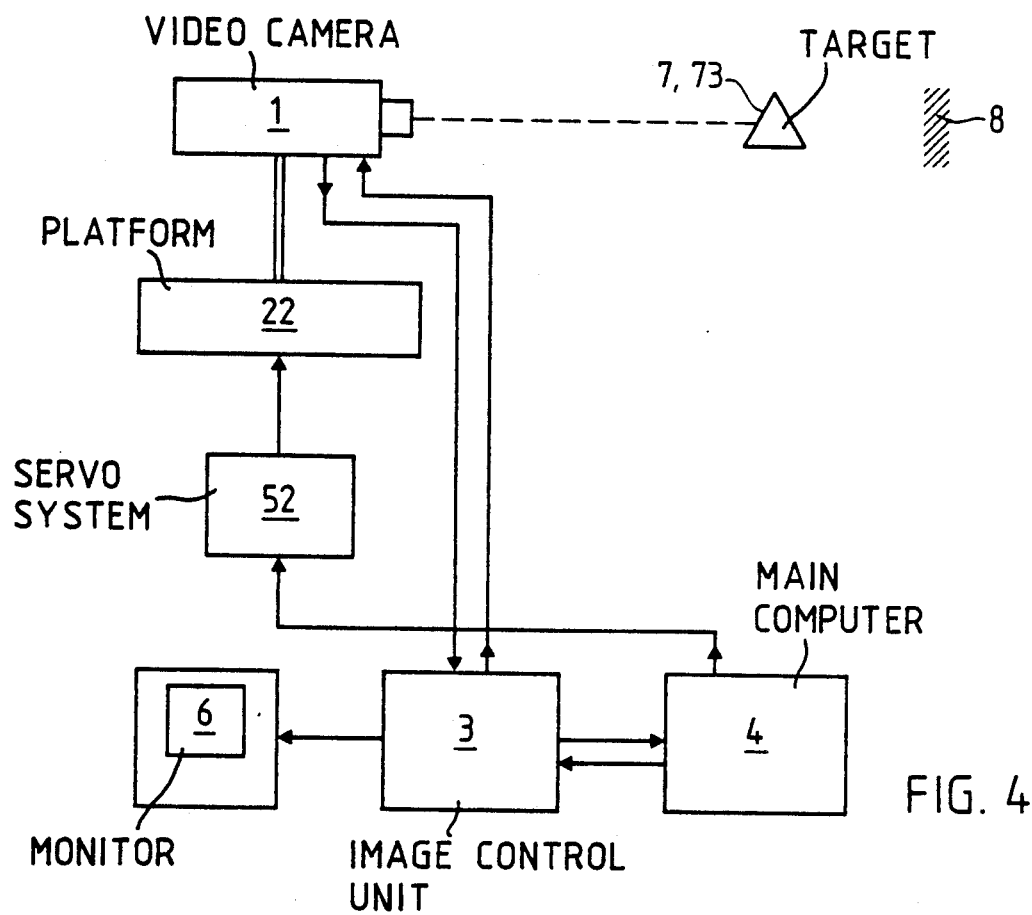
FIG. 4 is a schematic block circuit diagram of a second exemplary embodiment of the inventive apparatus for carrying out a second exemplary embodiment of the inventive method, namely the basic construction of a target tracking device containing a target tracking platform, the video camera and the image control unit as its basic components.

Also, the manipulator unit 2 may comprise a target tracking platform 22 for tracking an object 7 which constitutes a target 73, as illustrated in FIG. 4 of the drawings.

The inventive apparatus schematically illustrated in FIG. 1, essentially comprises the aforementioned video camera 1 which images the object 7 and transmits digital electrical signals representative of the image data produced by the video camera 1 to an image control unit 3. In this image control unit 3 the data representative of the image are evaluated and control signals are generated and returned to the video camera 1 for achieving optimum adjustment of gain/offset control means 1A of such video camera 1. The processed image data which are generated by the image control unit 3, are received by a main computer or computer means 4 and transformed or converted thereby into adjustment control signals. Such adjustment control signals are translated into a sequence of movements of the industrial robot 21 or the aforementioned fully automated controllable machine tool by means of a servo system 51. Additionally, the main computer or computer means 4 controls the entire course of movement or adjustment of the device and thus, for example, also a platform 22 through a further servo system 52. The platform 22 is mechanically rigidly connected to the video camera 1 and thus permits the video camera 1 to track the object 7. If desired, the image control unit 3 and the main computer or computer means 4 can be assembled to form a structural unit.

Figure 2:
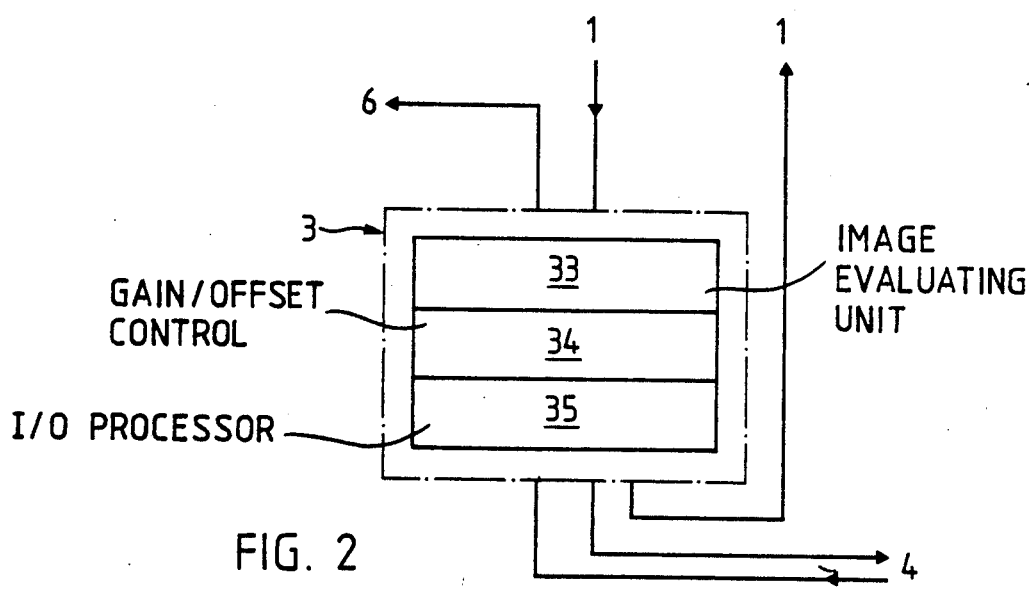
FIG. 2 is a schematic block circuit diagram showing the main components and connections of the image control unit in the apparatus shown in FIG. 1.

The basic construction of the image control unit 3 and its main connections are illustrated in FIG. 2. As shown, the image control unit 3 comprises an image evaluating unit 33, a gain/offset control 34 and an I/0 processor 35.

The electrical analog signals representative of the image data and produced by the video camera 1 are first digitized by means of an A/D converter, i.e. transformed or converted into digit sequences or digital data indicative of the brightness of the individual image elements or pixels in the imaging area of the video camera 1. Subsequently these digital image data are supplied to the image evaluating unit 33 of the image control unit 3. The digitized image data or video signal is interpreted or evaluated by means of the image evaluating unit 33. Such evaluation is based on the so-called gray-scale histogram analysis for distinguishing or discriminating between the image of the object 7 and the image of the background 8 associated with the object 7. The principle of such gray-scale histogram analysis is well known in the art and described, for example, in Chapter 7 of the book entitled "Digital Image Processing" by R. C. Gonzalez and P. Wintz, Addison-Wesley Publishing Company Inc. 1977, and, with reference to a particular imaging process, in U.S. Pat. No. 4,613,269.

As a result of such gray-scale histogram analysis by means of the image evaluating unit 33 of the image control unit 3, there is obtained a weighted brightness 13 associated with the image of the object 7 as well as a weighted brightness 14 of the image of the background 8 associated with the object 7. As already mentioned hereinbefore, the weighted brightness values 13 and 14 result from a measurement of the brightness of each individual image element or pixel in the imaging area or a preselected image section or frame of the video camera 1.

The weighted brightness values 13 and 14 are translated into control signals by means of the gain/offset control 34 of the image control unit 3. The transformation of the brightness values into the desired control signals is carried out in accordance with conventional principles such as known for example, from U.S. Pat. No. 4,204,229, granted May 20, 1980. The thus obtained control signals are fed to the video camera 1, specifically to the gain/offset control means 1A thereof through the I/O processor 35 of the image control unit 3. The control signals permit operating the video camera 1 under optimum operating or imaging conditions.

Figure 3:
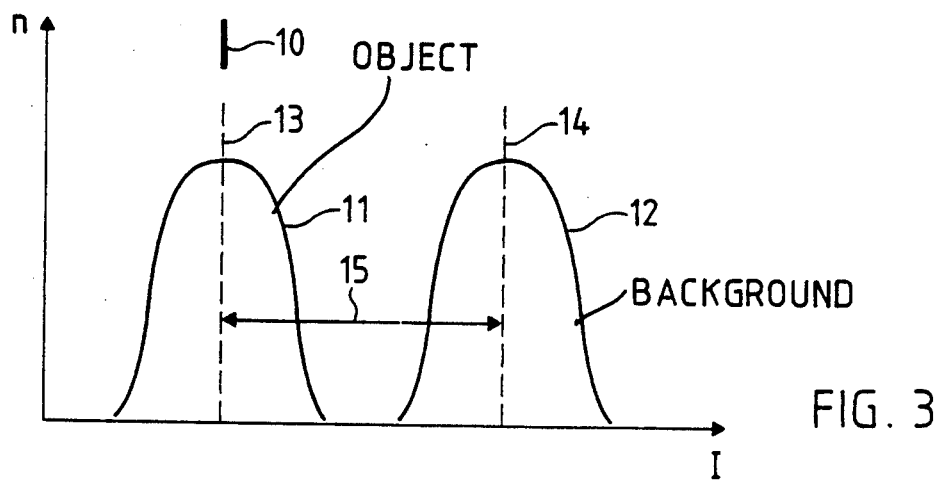
FIG. 3 is a histogram showing the brightness of the image elements or pixels of the image produced by the video camera, which is used in the apparatus shown in FIG. 1, and illustrates the brightness distributions respectively associated with the image of the object and the image of the background associated with such object.

For this purpose, and as illustrated in FIG. 3 of the drawings, an offset control signal is generated by the gain/offset control 34 of the image control unit 3. Such offset control signal, as illustrated in FIG. 3, causes the offset of the gain/offset control means 1A to be adjusted such that the weighted brightness 13 of the brightness distribution 11 which is related to the image of the object 7, assumes a predetermined fixed value 10. Furthermore, the gain/offset control 34 of the image control unit 3 generates a gain control signal which causes the gain of the gain/offset control means 1A of the video camera 1 to be adjusted such that there is obtained an optimum value for the contrast 15 between the weighted brightness 13 related to the image of the object 7 and the weighted brightness 14 related to the image of the background 8 which is associated with the object 7.

It is decisive for this operation that the offset control signal and the gain control signal are selected such that there is obtained minimum overlap of the brightness distributions 11 and 12 which are respectively associated with the image of the object 7 and the image of the background 8 associated with the object 7, at minimum contrast 15 between the respective weighted brightness values 13 and 14. The gain/offset control means 1A provided at the video camera 1 are of conventional construction and their adjustment by means of respective control signals are known in the art, see, for example, the aforementioned U.S. Pat. No. 4,204,229, granted May 20, 1980, and the publication entitled "A Real-Time Video Tracking System" by A. L. Gilbert et al in IEEE Transactions on Pattern Analysis and Machine Intelligence, Vol. PAMI-2, No. 1, pages 47 to 56 January 1980.

Figure 5:
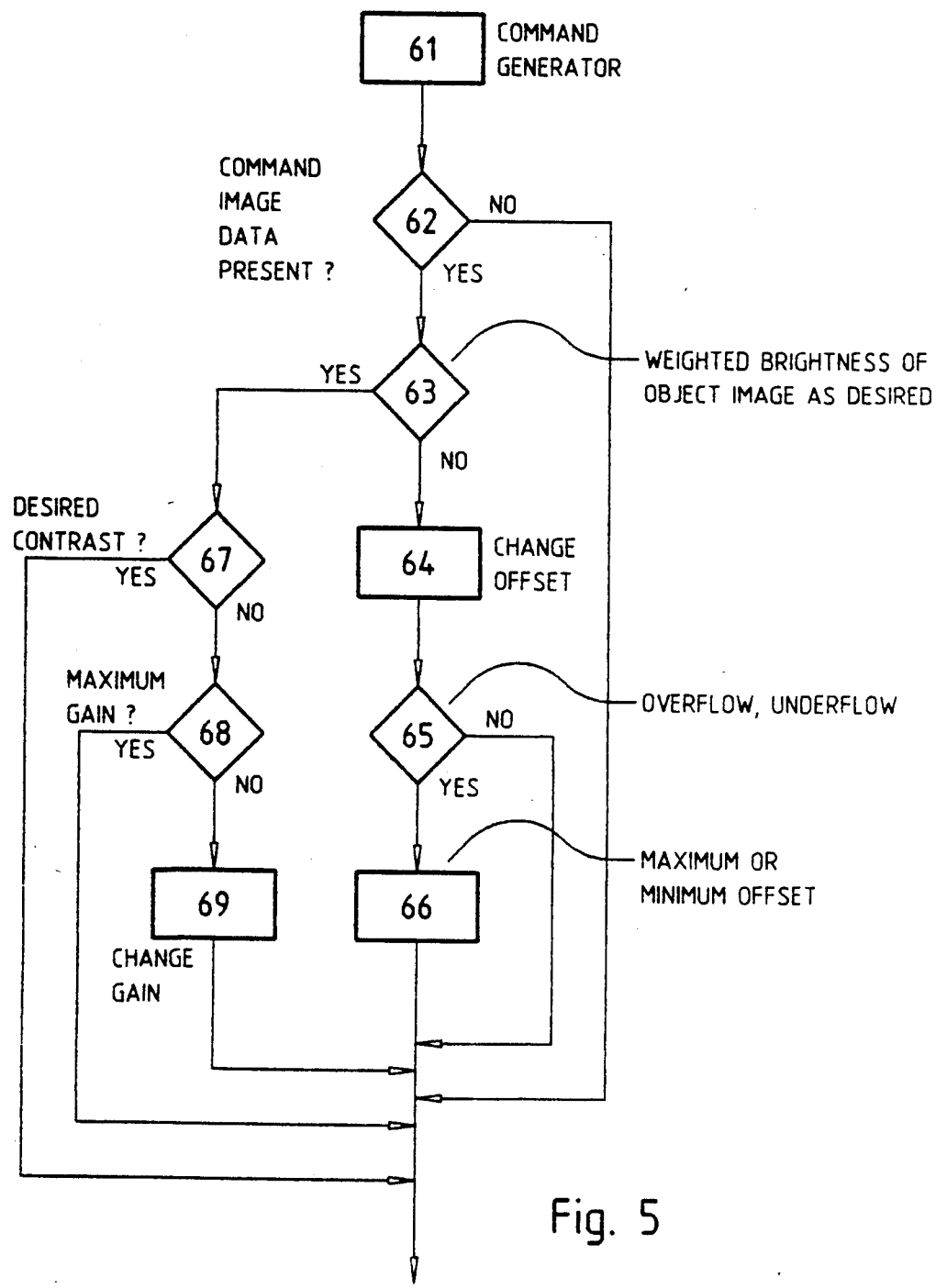
FIG. 5 is a schematic flow diagram illustrating the data flow in the apparatus shown in FIG. 1 during a gain/offset control adjusting operation.

The chronological course of the gain/offset control adjusting operation will now be described with reference to FIG. 5. During the gain/offset control adjusting operation, a command generator 61 periodically generates commands or input data for activating the gain/offset control unit 34 in the image control unit 3. The periodic generation of the commands or input data is adapted to the response time of the video camera 1 like, for example, the forward looking infrared camera. In the event that the apparatus further contains the automatic focusing control as described in the initially mentioned and cross-referenced, commonly assigned and copending United States application, the periodic generation of the command or input data is also adapted to the response time of the focusing control. The presence of such command or input data as well as the presence of the image data received by the image evaluating unit 33 of the image control unit 3, is checked at a test point 62. In the absence of such command or input data and image data, there is departed from the gain/offset control cycle.

In the presence of such command or input data and image data, there is checked at a test point 63 whether the weighted brightness 13 of the object image already has the predetermined fixed value 10. If this is the case, the gain/offset control adjusting operation is continued in order to properly adjust the gain of the gain/offset control means 1A of the video camera 1. If the weighted brightness 13 of the object image is different from the predetermined fixed value 10, the offset adjustment is changed at a step 64.

At a next-following test point 65, there is checked whether the change in the offset adjustment effected during the step 64, has resulted in an overflow or underflow on the offset scale. If no such overflow or underflow on the offset scale is observed, there is again departed from the gain/offset control cycle. If an overflow or underflow on the offset scale is observed, the respective maximum value or minimum value is loaded into an offset command register during a step 66.

After the desired offset adjustment has been achieved, the gain/offset control adjusting operation is continued at a test point 67. At this test point 67, there is checked whether the difference between the weighted brightness 13 of the object image and weighted brightness 14 of the background image, i.e. the contrast 15 is in the desired range. If such is the case, there is departed from the gain/offset control cycle.

If the difference between the weighted brightness 13 of the object image and the weighted brightness 14 of the background image is insufficient, there is checked at a test point 68 whether the gain adjustment has reached a maximum value. If the maximum gain adjustment has been reached, there is departed from the gain/offset cycle. If the maximum permissible gain adjustment has not been reached, the gain adjustment is changed during a further step 69.

It should be noted that, when carrying out the aforedescribed gain/offset control adjusting operation, the term "departed from the gain/offset cycle" means that no further tests and readjustments are carried out during the running gain/offset cycle. In the next-following step, therefore, the gain/offset cycle is re-started by re-entering at the test point 62.

The aforedescribed method for optimizing the image produced by the video camera 1 in terms of brightness and contrast and which method is carried out by using the apparatus as illustrated in FIG. 1, can only be utilized, of course, when the object 7, be it the workpiece 71, the tool 72 or the target 73, can be recognized or detected relative to the background 8 on the basis of the aforementioned gray-scale histogram analysis. It should be noted, however, that movable objects 7 frequently move relative to a continuously changing background 8 whereby the recognizability or detectability of the object 7 is insured at least during some periods of time. This is true, for example, in the case of a workpiece 71 during the grasping phase but probably would no longer be insured after such workpiece 71 is automatically installed or mounted at a machine constituting the background 8 with respect to the workpiece 71. Likewise, a target 73 can be clearly recognizable or detectable relative to a clear sky prior to its immersion into the horizon silhouette.

It is the purpose of the inventive apparatus and the inventive method to adjust the imaging parameters of the video camera 1 by means of the gain/offset control means 1A at the time at which the object 7 is well recognized or detected, in a manner such that the recognizability or detectability of the object 7 is also insured with respect to a complex structured or camouflaging background 8. There can thus be achieved the result that the object 7, once it has been recognized or detected, remains clearly visible or recognizable even under adverse imaging conditions, i.e. in the event that the contour of the object 7 is hardly distinguished or differentiated from the contour or contours of the associated background 8.

In spite of the foregoing considerations it is still conceivable that an unambiguous automatic recognition or detection of the object 7 cannot be insured at any moment of time. In the event that the contrast in brightness between the object 7 and the associated background 8, in fact, is insufficient for permitting optimum gain adjustment, the gain adjustment by means of the gain/offset control means 1A is controlled by means of the gain control signal generated by the image control unit 3 in a manner such that the weighted brightness 13 related to the object 7 and the weighted brightness 14 related to the background 8 associated with the object 7 have the greatest possible contrast 15 without one of the two brightness distributions 11 and 12 which are respectively associated with the object 7 and the associated background 8, becoming saturated.

The gain/offset control 34 of the image control unit 3 delivers digital data. Such digital data, as already mentioned hereinbefore, are converted or transformed by means of the I/O processor 35 into a format acceptable for the gain/offset control means 1A of the video camera 1 and supplied to such gain/offset control means 1A.

In principle, it is also conceivable that the image evaluation is not effected in digital manner in the image control unit 3 via the digital image evaluating unit 33 conjointly with the digitally operating gain/offset control 34 and the I/O processor 35 series-connected therewith but is directly carried out in analog format. This possibility could be advantageous in the event that the automatic gain/offset control unit 34 is integrated with the video camera 1.

In addition to the weighted brightness 13 related to the object 7 and the weighted brightness 14 related to the background 8 associated with the object 7, the image evaluating unit 33 of the image control unit 3 communicates to the I/O processor 35 of the image control unit 3 data indicative of the position of the object image within the imaging area of the video camera 1. Such position data are supplied to the main computer or computer means 4 which causes the servo system 51 to re-adjust the position of the object 7 by means of the industrial robot 21. In addition thereto it may prove necessary or desirable for the video camera 1 to follow or track the object 7. For this purpose, related control signals could be generated and supplied directly by the main computer or computer means 4 or indirectly through a further or additional servo system 52 controlling the positional adjustment of the platform 22. The video camera 1 is mechanically rigidly connected to the platform 22 and the adjustment of the platform 22 under the action of the control signals permits the video camera to track the object 7.

A monitor 6 is connected to the image control unit 3 and receives from the image control unit 3 via an A/D converter the signals required for reproducing the image, which is produced by the video camera 1, on the screen of the monitor 6. The operation of the inventive apparatus thus can be visually monitored by observing the reproduced image at the screen of the monitor 6. It should be noted, however, that the monitor 6 cannot offer an image which constitutes the best possible image for the operator because, as already explained hereinbefore, the image optimization in terms of brightness and contrast is not optimumly adapted to the eye of the person viewing the monitor 6 but in fact, is optimumly adapted for the control of the manipulator unit 2.

A second exemplary embodiment of the inventive apparatus for carrying out a second exemplary embodiment of the inventive method is illustrated in FIG. 4 showing a target tracking apparatus. Such target tracking apparatus comprises an adjustable platform 22 which can be adjusted with respect to azimuth and elevation, the video camera 1 constituting, for example, a forward looking infrared camera which is mechanically rigidly connected with the adjustable platform 22, the servo system 52 for controlling the positional adjustment of the platform 22, and the aforedescribed image control unit 3 constituting a so-called video tracker. The image control unit 3 or video tracker monitors the operation of the video camera 1 as well as, with the aid of the main computer or computer means 4, the positional adjustment of the adjustable platform 22 on the basis of the image of the object 7, i.e. the target 73 and the related signals which are produced by means of the video camera 1. The monitor 6 is connected with the image control unit 3 and permits the operator to visually track the target 73.

While there are shown and described present preferred embodiments of the invention, it is to be distinctly understood that the invention is not limited thereto, but may be otherwise variously embodied and practiced within the scope of the following claims. ACCORDINGLY,

What we claim is:

1. An apparatus for automatic gain/offset control of a video camera, comprising:
   a video camera containing gain/offset control means;
   an image control unit connected to said gain/offset control means of said video camera, comprising an image evaluating unit, a gain/offset control unit and an I/O processor;
   said image control unit comprising means for receiving data representative of an image of an object and a background associated with said object; and
   said image control unit comprising means for generating, in response to said data received and evaluated by said image control unit, a control signal for automatically controlling said gain/offset control means of said video camera in terms of imaging said object at optimum brightness and contrast with respect to said background associated with said object.

2. The apparatus as defined in claim 1, wherein:
   said image control unit determines a weighted brightness associated with the image of said object;
   said image control unit generating, in response to said weighted brightness associated with the image of said object and as said control signal, an offset control signal controlling an offset adjustment of said gain/offset control means of said video camera; and
   said offset adjustment of said gain/offset control means being adjusted by said offset control signal to a predetermined fixed value of said weighted brightness associated with the image of said object.

3. The apparatus as defined in claim 1, wherein:
   said image control unit determines a brightness distribution associated with the image of said object and a brightness distribution associated with the image of said background associated with said object;
   said image control unit generating, in response to said brightness distributions of the image of said object and the image of the background associated with said object and as said control signal, a gain control signal controlling a gain adjustment of said gain/offset control means of said video camera; and
   said gain adjustment of said gain/offset control means being adjusted by said gain control signal to a predetermined contrast between said brightness distributions respectively associated with the image of said object and the image of said background associated with said object.

4. The apparatus as defined in claim 3, wherein:
   said gain adjustment of said gain/offset control means of said video camera being adjusted under the action of said gain control signal to minimum overlap between said brightness distributions associated with the image of said object and the image of the background associated with said object, at minimum contrast and in the absence of brightness saturation.

5. The apparatus as defined in claim 3, wherein:
   said gain adjustment of said gain/offset control means of said video camera being adjusted, upon comparatively little contrast between the image of said object and the image of the background associated with said object, to maximum possible contrast between said brightness distributions associated with the image of the object and the image of the background associated with said object, in the absence of brightness saturation.

6. The apparatus as defined in claim 1, further including:
   computer means connected with said image control unit;
   a manipulator unit connected with said computer means;
   said manipulator unit including a platform;
   said video camera being mounted at said platform; and
   a servo system interconnecting said platform and said computer means for controlling a position of said platform and thereby the position of said video camera in response to image data received by said image control unit and transmitted to said computer means.

7. The apparatus as defined in claim 6, further including:
   said manipulator unit including an industrial robot;
   said object imaged by said video camera selectively constituting either one of (i) a workpiece mounted at said industrial robot or (ii) a tool of a machine tool operating upon a workpiece; and
   a further servo system interconnecting said computer means and said industrial robot for controlling the position of either one of (i) said workpiece or (ii) said tool of said machine tool.

8. The apparatus as defined in claim 6, wherein:
   said object to be imaged by said video camera constitutes a target to be tracked by said video camera;
   said image control unit constituting a video tracker; and
   said platform comprising a target tracking platform.

9. The apparatus as defined in claim 1, wherein:
   said video camera comprises a forward looking infrared camera.

10. A method of automatic gain/offset control of a video camera equipped with gain/offset control means, comprising the steps of:

imaging an object and a background associated with said object, by means of the video camera equipped with said gain/offset control means;

determining by means of a gray-scale histogram analysis, the brightness of an image of said object and a brightness of the image of the background associated said object as well as a contrast between the image of said object and the image of said background associated with said object; and generating control signals for automatically adjusting the gain/offset control means of said video camera as a function of a determined brightness and said contrast.

11. The method as defined in claim 10, wherein:

said step of generating said control signals for automatically adjusting said gain/offset control means of said video camera entails generating offset control signals for automatically adjusting an offset of said gain/offset control means to a predetermined fixed value of a weighted brightness of the image of said object.

12. The method as defined in claim 10, wherein:

said step of generating said control signals for automatically adjusting said gain/offset control means of said video camera entails adjusting a gain of said gain/offset control means to a predetermined spacing between a brightness distribution associated with the image of said object and a brightness distribution associated with the image of the background associated with said object.

13. The method as defined in claim 12, wherein:

said step of adjusting the gain/offset control means of said video camera entails adjusting said gain for minimum overlap between said brightness distributions respectively associated with the image of said object and the image of said background associated with said object, at minimum contrast in absent brightness saturation.

14. The method as defined in claim 12, wherein:

said step of adjusting the gain/offset control means of said video camera entails adjusting, upon comparatively little contrast between the image of said object and the image of said background associated with said object, said gain for maximum possible contrast between said brightness distributions respectively associated with the image of said object and the image of said background associated with said object, in the absence of image saturation.

15. The method as defined in claim 10, further including the steps of:

determining position data indicative of a position of the image of said object within an imaging area of said video camera;

controlling adjustment of an adjustable manipulator unit; and generating adjustment control signals for adjusting said adjustable manipulator unit as a function of said position data.

16. The method as defined in claim 15, wherein:

said step of imaging said object and said background associated with said object by means of said video camera entails selectively imaging, as said object, either one of (i) a workpiece mounted at an industrial robot or (ii) a tool of a machine tool operating upon a workpiece; and during said step of controlling the adjustment of said adjustable manipulator unit, controlling, as the adjustment of said manipulator unit, the adjustment of either one of (i) said industrial robot or (ii) said tool of said machine tool.

17. The method as defined in claim 15, wherein:

said step of imaging said object and said background associated with said object by means of said video camera entails selectively imaging, as said object, either one of (i) a workpiece mounted at an industrial robot or (ii) a tool of a machine tool operating upon a workpiece; and during said step of controlling the adjustment of said adjustable manipulator unit, controlling, as the adjustment of said manipulator unit, the adjustment of a platform supporting said video camera for positioning said image of said object in a predetermined region of said imaging area of said video camera.

18. The method as defined in claim 15, wherein:

said step of imaging said object and said background associated with said object by means of said video camera entails imaging a target to be tracked; and during said step of controlling the adjustment of said manipulator unit controlling, as the adjustment of said manipulator unit, the adjustment of a target tracking platform at which said video camera is mounted.

19. The method as defined in claim 10, wherein:

said step of imaging said object and said background associated with said object by means of said video camera entails imaging said object and said background associated with said object by means of a forward looking infrared camera.

* * * * *